P. SWAN & B. E. RIGGS
Nut Lock.
No. 201,716. Patented March 26, 1878.
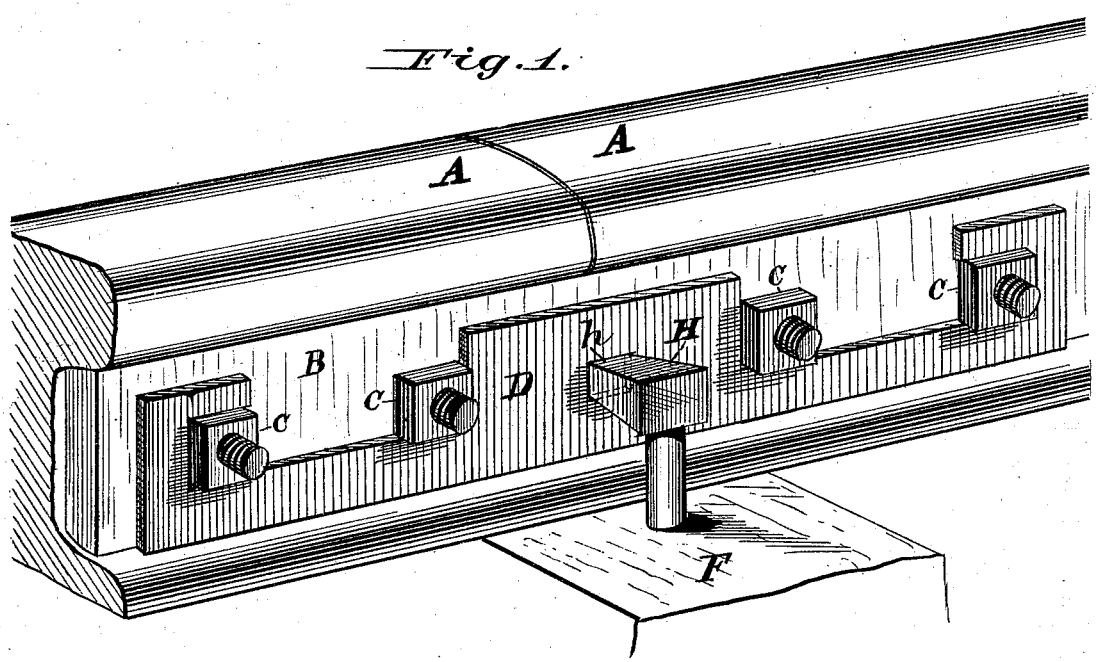
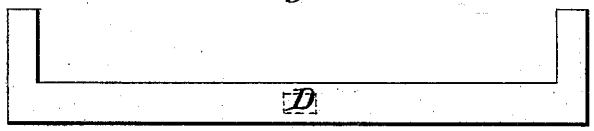
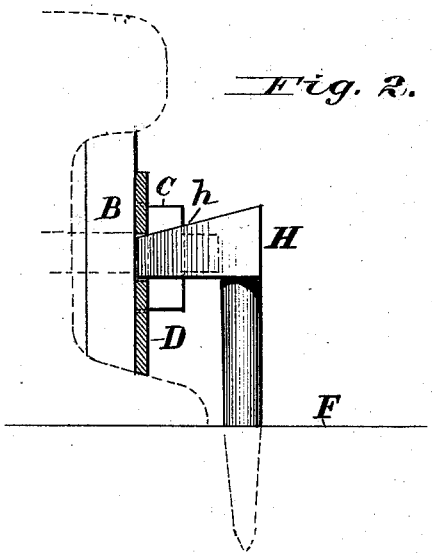
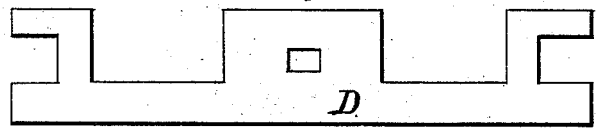
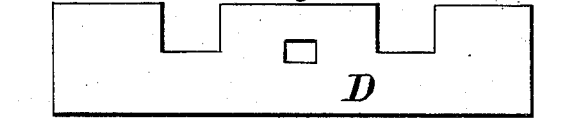
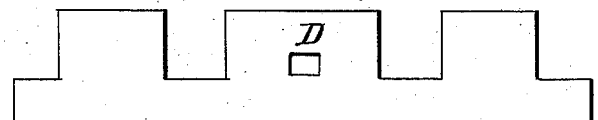
Attest:
H. L. Perrine
H. A. Daniels
Inventors:
Peleg Swan
Benjamin E. Riggs
By Myers & Co. Atty's

UNITED STATES PATENT OFFICE.

PELEG SWAN, OF LITCHFIELD, AND BENJAMIN E. RIGGS, OF HOMER, MICH.

IMPROVEMENT IN NUT-LOCKS.

Specification forming part of Letters Patent No. 201,716, dated March 26, 1878; application filed November 20, 1877.

*To all whom it may concern:*

Be it known that we, PELEG SWAN, of Litchfield, Hillsdale county, State of Michigan, and BENJAMIN E. RIGGS, of Homer, Calhoun county, and State aforesaid, have invented certain Improvements on Nut-Locks, used in connection with fish-bars at the joints of railway-rails; and do hereby declare that the following is a full description thereof, reference being had to the accompanying drawing, and to the letters of reference marked thereon, like letters indicating like parts in the several figures in said drawing.

In our improved device we use an additional plate, which is placed against the fish-plate located at a joint of rails, said additional plate being so constructed as to set against two or more edges of each of the nuts on the bolts running through fish-bar and rail. This additional plate has an aperture to receive the end of an arm projecting laterally from a spike or screw driven in near the rail, so that when the spike is driven properly in position the plate is held firmly against the nuts, and the latter are thus prevented from turning.

In the accompanying drawing, forming part of this specification, Figure 1 is a perspective view, showing a joint of rails and fish-bar provided with our improvements. Fig. 2 shows the application of the spike with its projecting arm. Figs. 3, 4, 5, and 6 show plans of various forms of the plate which holds the nuts in position.

A designates the end of each rail at a joint, and B the fish-bar in its usual position. C indicates the nuts on the ends of the bolts which pass through the fish-bar and rails. D indicates a plate formed with rectangular spaces or recesses, so as to set against two or more sides of the rectangular nuts C, as plainly shown in Fig. 1. This plate D may be modified in form, as shown in several figures of the drawing, and is made with a square aperture to receive the end of a tapering arm, *h*, formed on and extending from the bolt or spike H, driven in one of the cross-ties, as shown. The spike H, as shown in Fig. 2, has an arm, *h*, formed on it, which extends at right angles from the spike at the head, and tapers to the outer end. The relative positions of the plate D and the spike H are illustrated in Fig. 2, the cross-tie being indicated by F.

By this construction and adjustment of the parts D and H, the nuts C are prevented from turning, and the fish-bar is firmly held in its original position.

It will be observed that the arm *h* of spike H, when depressed and inserted in plate D, not only causes the plate to press against the nuts C, but also acts as a shoulder to hold the spike down, and prevents its being loosened, withdrawn from the timber, or deflected from its position in relation to plate D, which secures the nuts in position, and thus the arm of the spike, which has two functions, fully accomplishes, in connection with its adjuncts, the intended purpose.

We are aware that ordinary spikes have been used to hold locking-plates employed in nut-locking devices in position, as shown in the patent of A. McKenney, reissued March 4, 1873, No. 5,308, which we disclaim; but it is found in practice that the frequent and severe agitation of railroad-rails, together with their natural contraction and expansion, ultimately causes the component parts of such lock-nuts to work loose. This defect it is the design of our invention to remedy, by projecting a bolt provided with a right-angular arm through the locking-plate, in such manner that when the rail is depressed by a passing train the right-angular arm of the bolt may be depressed with the rail, and thereby tightened, rather than deflected from its original and intended position.

We claim—

The spike H, with rectangular arm *h*, for holding the parts rigidly in position, and plate D, with rectangular aperture for securing the nuts C, substantially as shown, and for the purpose described.

In testimony that we claim the foregoing we have hereunto set our hands this 27th day of October, A. D. 1877.

PELEG SWAN.
BENJAMIN E. RIGGS.

Witnesses:
WM. H. HERRICK,
S. D. MCNEAL.